Nov. 9, 1943.     A. E. ISCHINGER     2,334,008
HOSIERY DISPLAY DEVICE
Filed June 27, 1941     9 Sheets-Sheet 1

INVENTOR:
Alfred E. Ischinger

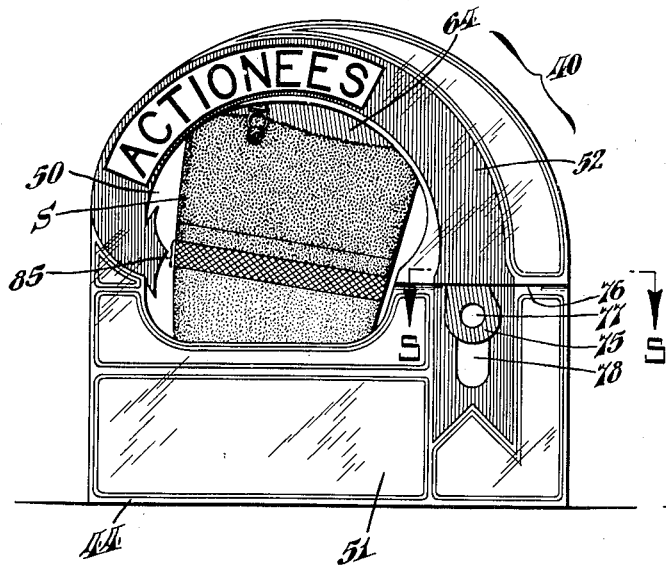
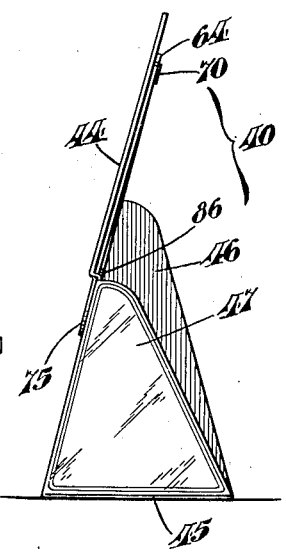
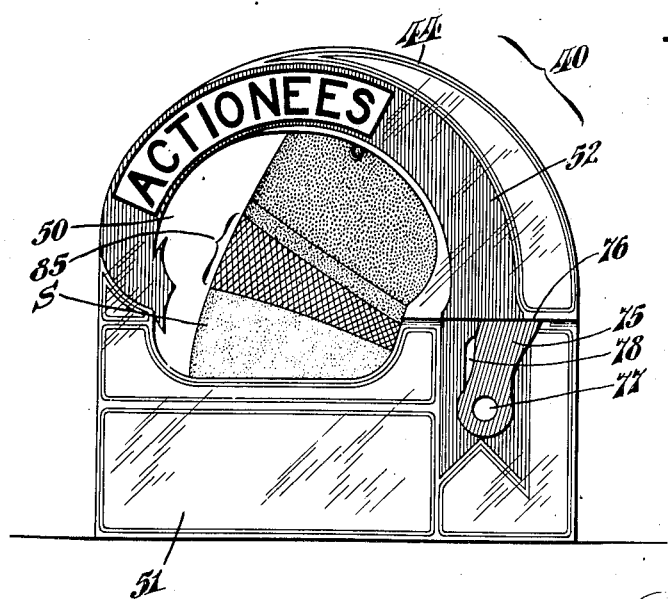
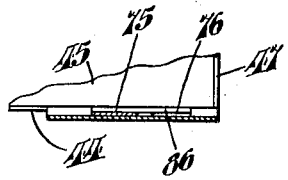

Nov. 9, 1943.    A. E. ISCHINGER    2,334,008
HOSIERY DISPLAY DEVICE
Filed June 27, 1941    9 Sheets-Sheet 3
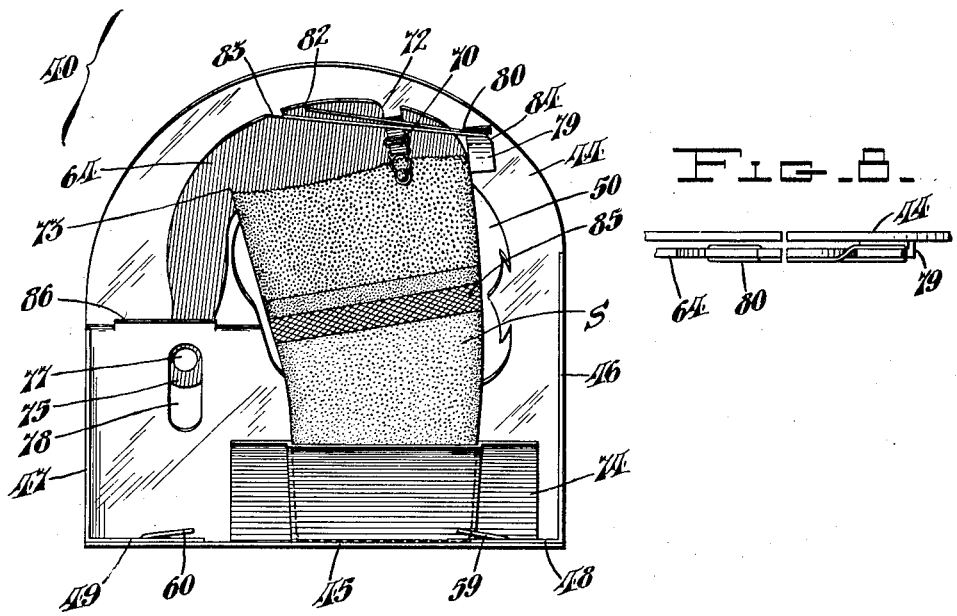
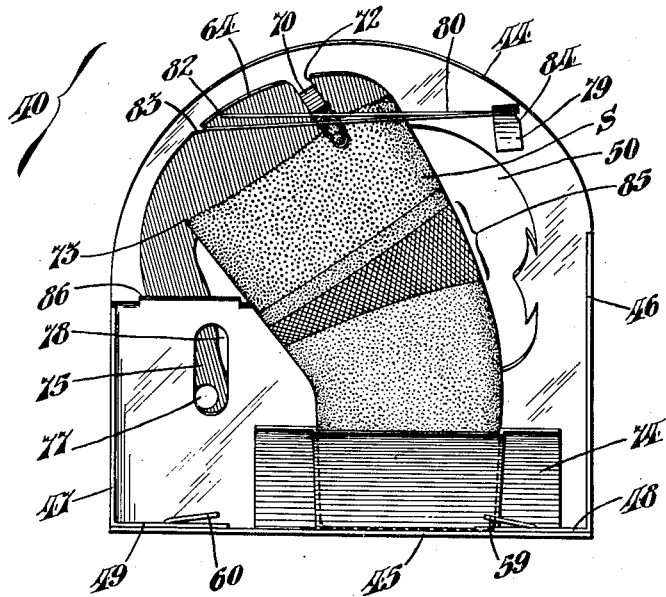
INVENTOR:
Alfred E. Ischinger Nov. 9, 1943.    A. E. ISCHINGER    2,334,008
HOSIERY DISPLAY DEVICE
Filed June 27, 1941    9 Sheets-Sheet 4

INVENTOR:
Alfred E. Ischinger

Nov. 9, 1943.   A. E. ISCHINGER   2,334,008
HOSIERY DISPLAY DEVICE
Filed June 27, 1941    9 Sheets-Sheet 5
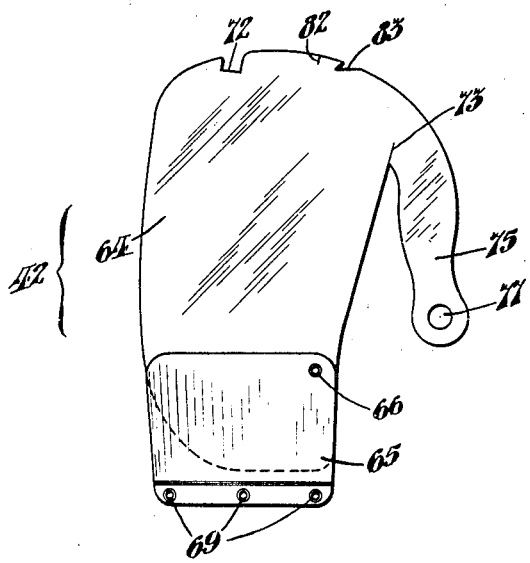
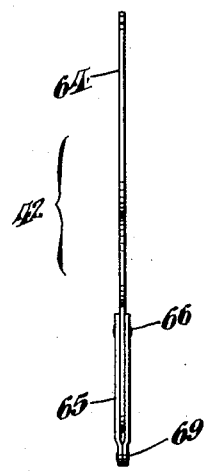
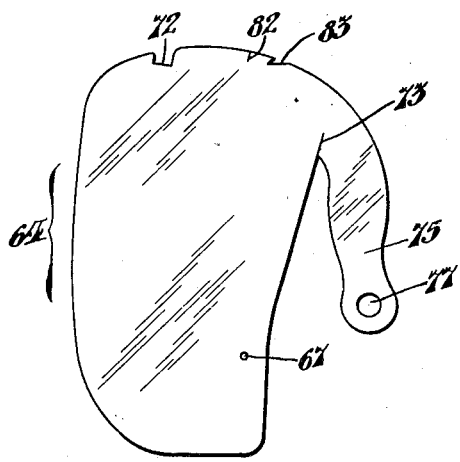
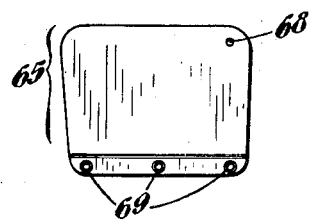
INVENTOR:
Alfred E. Ischinger INVENTOR:
Alfred E. Ischinger Nov. 9, 1943.  A. E. ISCHINGER  2,334,008
HOSIERY DISPLAY DEVICE
Filed June 27, 1941  9 Sheets-Sheet 7
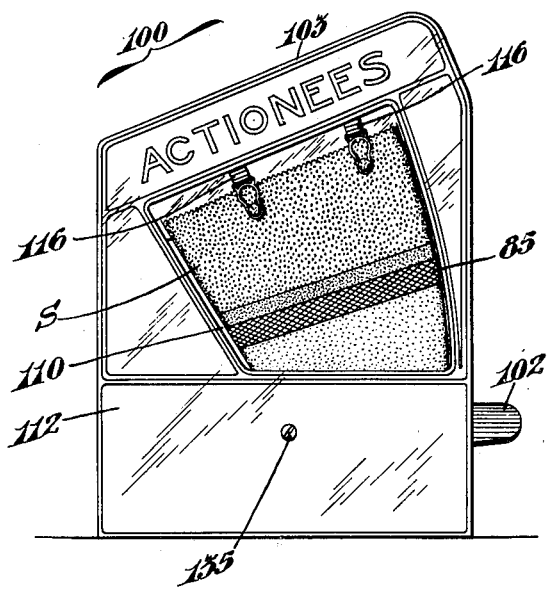
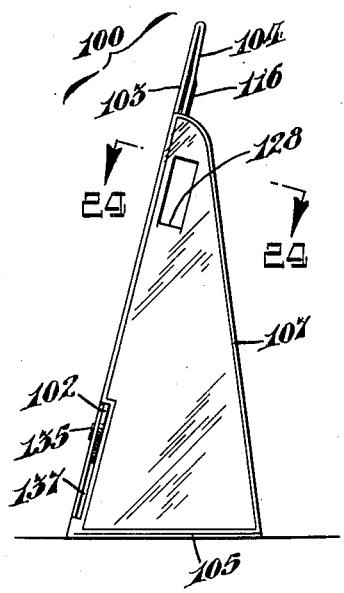
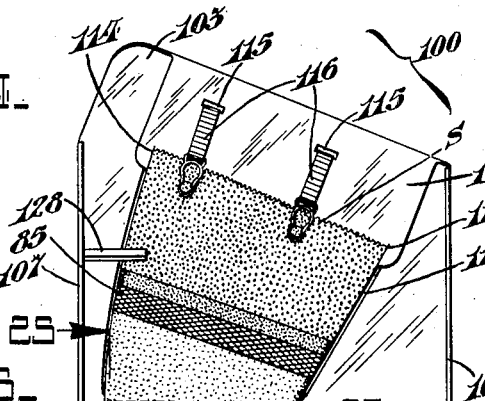
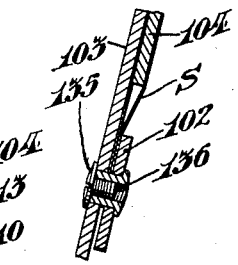
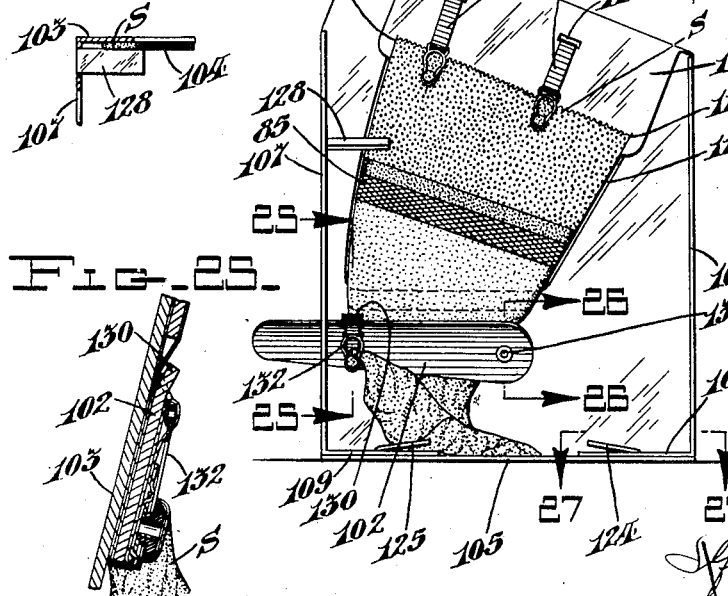
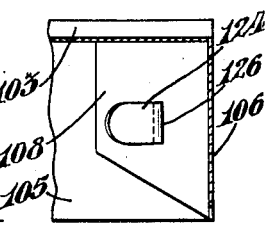
INVENTOR:
Alfred E. Ischinger Nov. 9, 1943.      A. E. ISCHINGER      2,334,008
HOSIERY DISPLAY DEVICE
Filed June 27, 1941      9 Sheets-Sheet 8

INVENTOR:
Alfred E. Ischinger

Nov. 9, 1943. A. E. ISCHINGER 2,334,008
HOSIERY DISPLAY DEVICE
Filed June 27, 1941
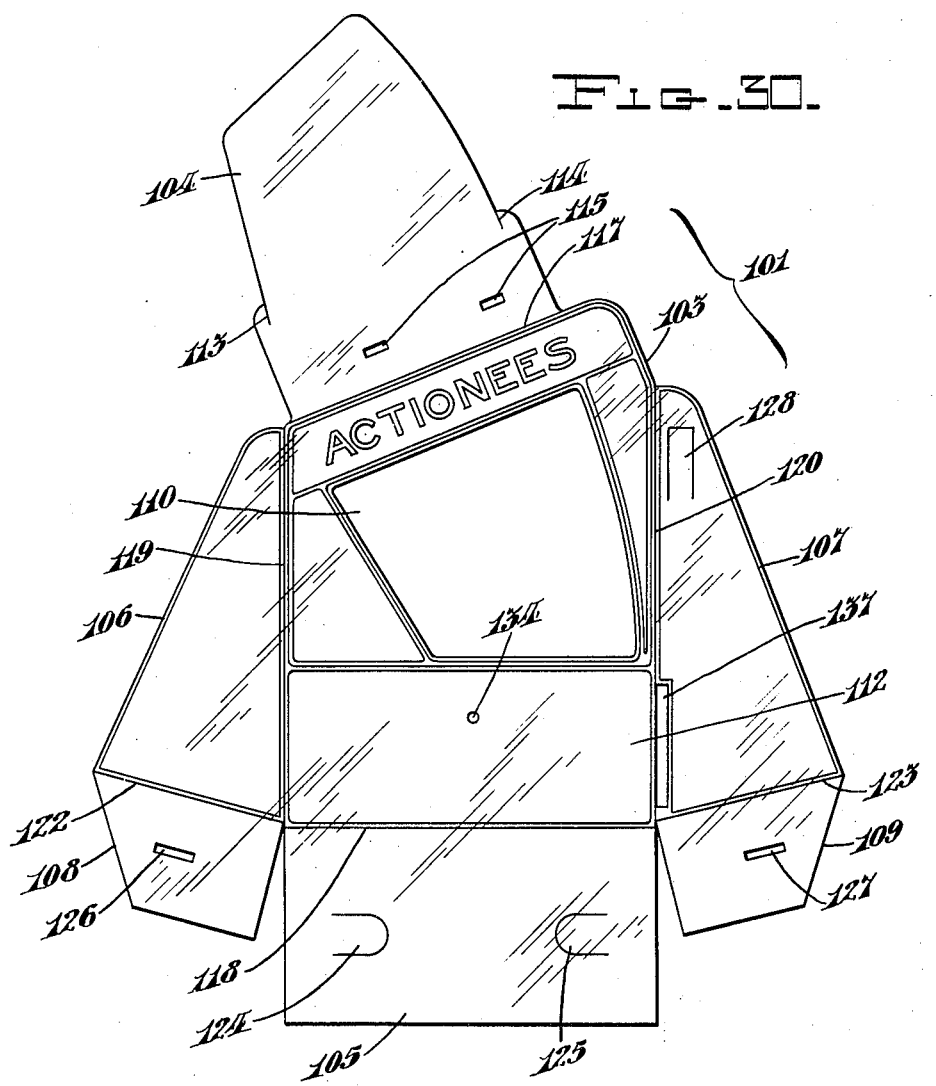
Fig. 30.
Fig. 31.
INVENTOR:
Alfred E. Ischinger Patented Nov. 9, 1943

2,334,008

UNITED STATES PATENT OFFICE 2,334,008

HOSIERY DISPLAY DEVICE

Alfred E. Ischinger, Mount Penn, Pa., assignor to Berkshire Knitting Mills, Wyomissing, Pa., a corporation of Pennsylvania Application June 27, 1941, Serial No. 400,123

26 Claims. (Cl. 35—56)

This invention relates to hosiery display and actuating devices which are mainly constructed of sheet material such as cardboard; and more particularly to a device of this type which can be operated to demonstrate the action of a certain part of a stocking in imitation of the actual action which takes place when such a stocking is in use on the leg of a wearer.

One object of the invention is to provide a device of the referred to type, which embodies new and advantageous features of construction, operation and appearance.

Another object is to provide such a device which utilizes the contracting force of the stocking fabric in conjunction with its operation.

A further object is to provide such a device which can be operated to subject a stocking part to substantially the same conditions of expansion, contraction, and sliding action, as when in use on the leg of a wearer.

An additional object is to provide a device of the referred to type which is particularly adapted to demonstrate the action of an elastic yarn section embodied in the upper part of a stocking.

It is also an object of the invention to provide such a device which utilizes the contracting force of the fabric of a stocking to partly, or entirely, effect operation of the actuator of the device, in one direction.

With these and other objects in view, which will become apparent from the following detailed description of the illustrative embodiments of my novel hosiery display and action demonstrating device, shown in the accompanying drawings, the invention comprises the novel elements, features of construction and arrangement of parts in cooperative relationship as herein disclosed, and more particularly pointed out in the appended claims.

In the accompanying drawings,

Fig. 2 is a front view of the device shown in Fig. 1;

Fig. 3 is a side view of the device, as seen from the right of Fig. 2;

Fig. 4 is a view similar to Fig. 1, but shows certain parts of the device in another position, and a portion of the stocking part exhibited by the device in stretched condition;

Fig. 5 is a sectional view taken substantially along the line 5—5 of Fig. 2;

Figs. 6 and 7 are rear views of the device as illustrated in Figs. 2 and 4, respectively;

Fig. 8 is a top plan view of certain parts shown in Fig. 6;

Figs. 12 and 13 are front and side views, respectively, of the hosiery mounting and actuating unit of the display device;

Figs. 14 and 15 are front elevational views of the two elements which are pivotally connected to form the hosiery mounting and actuating unit shown in Figs. 12 and 13;

Fig. 21 is a front view of a modified form of my novel hosiery display device;

Figs. 22 and 23 are right end and rear views, respectively, of the device shown in Fig. 21;

Fig. 24 is a detail sectional view, taken substantially along the line 24—24 of Fig. 22, but being shown in a position at right angles relative to Fig. 22;

Fig. 25 is a detail sectional view, taken substantially along the line 25—25 of Fig. 23;

Fig. 26 is a detail sectional view, taken substantially along the line 26—26 of Fig. 23;

Fig. 27 is a detail sectional view, taken substantially as indicated by the arrows 27—27 on Fig. 23;

Fig. 30 illustrates a blank, or stamping, of sheet material, from which is formed the integral frame structure of my modified hosiery display device, more particularly illustrated by Figs. 21 to 29 inclusive; and Fig. 31 illustrates an actuator, or lever, which forms a part of the modified construction of my invention.

The hosiery display and action demonstrating device of my invention may be utilized to exhibit various conventional forms of hosiery, such as full-fashioned, or seamless, ladies' full length stockings, or parts thereof, made of silk, "nylon" or other yarns, and while the device is herein disclosed as particularly designed to display and demonstrate the action of a so-called "elastic yarn strain absorbing section," which in such stockings is ordinarily located above the knee area, it will be obvious to those skilled in the art that the device, as herein disclosed, can be readily modified within the scope of the invention to adapt it to display and demonstrate the action of different parts of ladies', or other types of hosiery.

Figure 9:
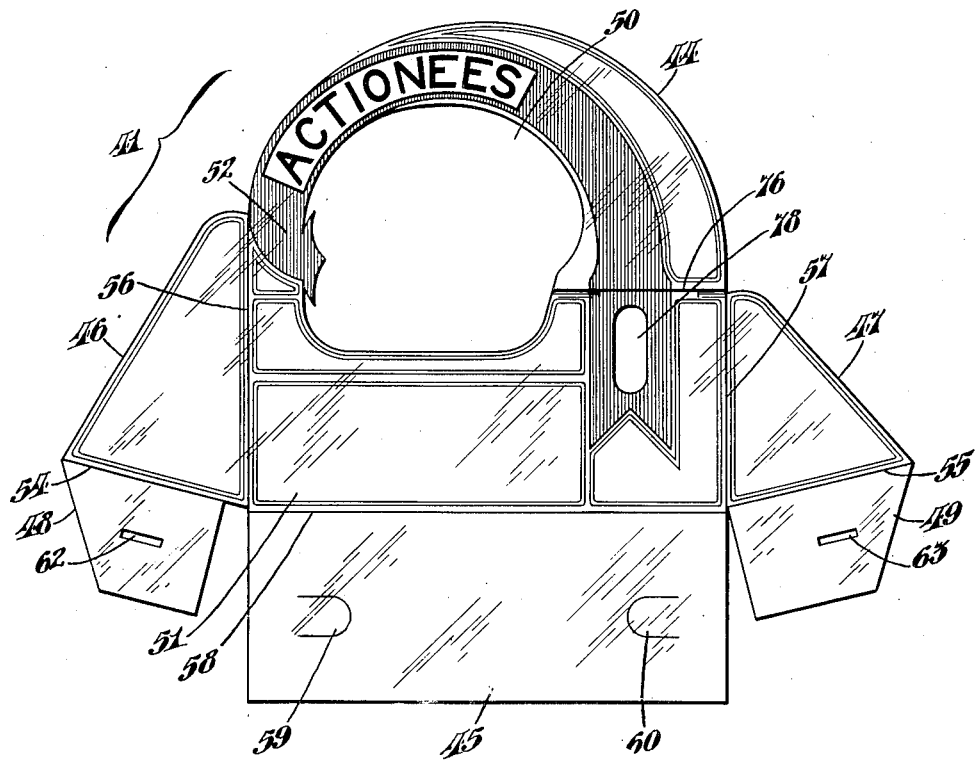
Fig. 9 illustrates a blank, or stamping, of sheet material, from which is formed the integral frame structure of the device of Fig. 1.
Figure 10:
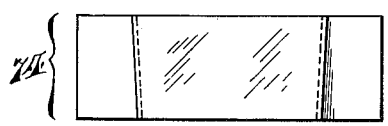
Fig. 10 is a detail view of a sheet material socket element which forms a part of the device.
Figure 11:
Fig. 11 is a top edge view of the element shown in Fig. 10.

Referring more particularly to the embodiment of my invention illustrated by Figures 1 to 20 inclusive, the device in this instance comprises an integral frame structure 40, which is formed from a sheet material blank 41 (Fig. 9), and a hosiery mounting and actuating unit 42, see Figs. 12 and 13.

The sheet material from which the blank 41 is formed, may be cardboard, or some other material having the requisite degree of strength, stiffness and other characteristics to make it suitable for a frame structure of the type illustrated. The blank is designed so that it may be readily stamped from sheet material, singly or in quantity, and comprises an integral flat piece provided with parts forming the members, or sections, of the frame structure formed therefrom, such as a front wall member 44, a base portion 45, and one or more wing or side members 46 and 47, each provided with a base extension indicated by the numerals 48 and 49. A suitable display aperture 50 is provided in the front wall member 44 of the blank 41, and, as illustrated, the member 44 is otherwise made attractive by ornamental lines or coloring arranged to provide one or more areas 51 for printing, advertising, etc., and may include a device such as an arrow 52 to direct attention to a particular point of interest associated with the article on display.

In forming the frame 40, from the blank 41, certain parts of the latter are folded along crease lines 54, 55, 56, 57 and 58 in such manner that the front wall member 44 is slightly inclined rearwardly, and the side members 46 and 47 function as side braces for the latter, with the extensions 48 and 49 overlapping opposite ends of the base member 45. The extensions 48 and 49 may be permanently or detachably secured to the base 45 in any suitable and well known manner, as by gluing, or by interengaging oppositely arranged tab, or tongue elements 59 and 60 on the base portion 45, with the slots 62 and 63 of extensions 48 and 49, respectively, in the manner shown in Figs. 6 and 7.

Figure 16:
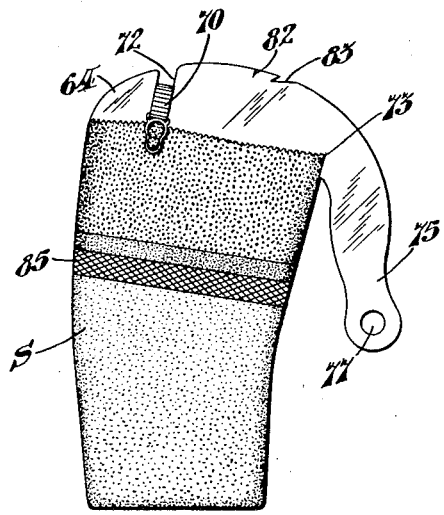
Figs. 16 and 17 are front and rear views, respectively, of the unit shown in Fig. 12, having a full length stocking, with elastic yarn strain absorbing zone, applied thereto.
Figure 17:
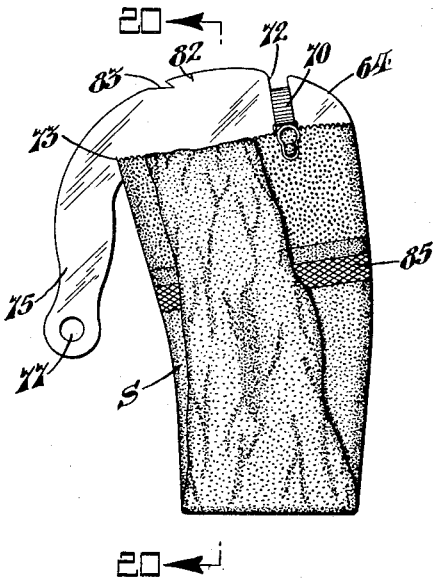
Figure 18:
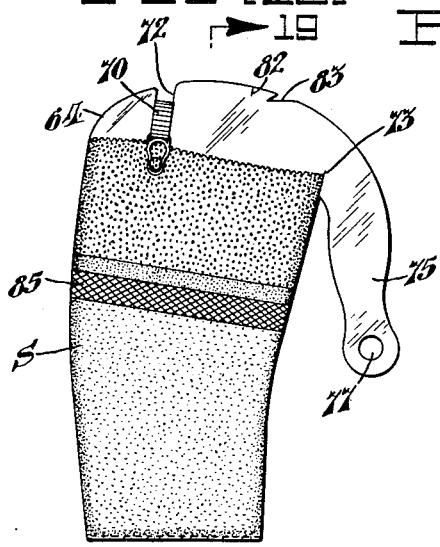
Fig. 18 is a view similar to Fig. 16, and illustrates the application to the unit of Fig. 12 of a special stocking part.
Figures 19, 20:
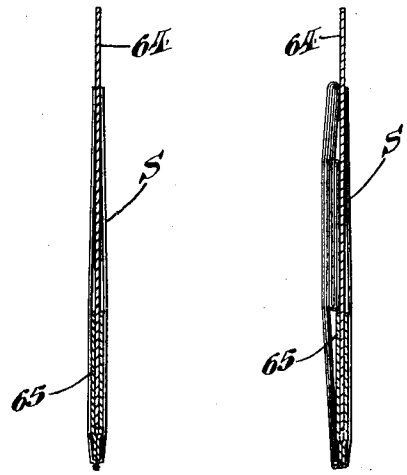
Fig. 19 is a sectional view taken substantially along line 19—19 of Fig. 18.
Fig. 20 is a sectional view taken substantially along line 20—20 of Fig. 17.

The hosiery mounting and actuating unit 42 (Figs. 12 and 13) comprises two members 64 (Fig. 14) and 65 (Fig. 15) which are pivotally connected to each other by means of an eyelet rivet 66, or other fastener device, inserted through openings 67 and 68. The lower member 65 of the unit 42 consists of a pair of complementary sheet material sections which are secured to each other along their lower edges by a plurality of eyelet rivets 69. The unit 42 is shaped to resemble in profile outline a section of the human leg, including the knee and adjacent parts, and is adapted to have mounted thereon a hosiery part ordinarily applied to such a leg section. Either a full length stocking, as shown in Figs. 16, 17 and 20, or only a special stocking part as shown in Figs. 18 and 19 may be mounted on the unit 42, and the letter "S" will consequently be used to designate both such forms. In this connection it is to be understood that whenever the expression "a stocking part" is hereinafter used in the specification or claims, this refers primarily to the stocking section utilized to accomplish the purpose of the device, irrespective whether such section comprises an entire stocking or only a part thereof.

To firmly hold the stocking part S in position on the mounting means 42, a conventional garter or fastener device 70 is mounted in a notch, or cut-out 72, in the member 64, and attached to the stocking part on opposite sides of the member 64. In addition, a cut 73 is provided in the member 64 into which the upper rear edge portion of the stocking part S is forced to thereby supplement the holding action of the fastener 70 in firmly anchoring the top part of the stocking on the unit 42.

To effect rigid connection of the unit 42 with the frame 40, there is provided a socket forming element 74 (Figs. 10 and 11) of cardboard or the like, which is glued or otherwise fastened to the rear of the wall 44, to provide a receiving socket into which the lower part 65 of the unit 42 is placed or forced for support; the socket 74 and unit part 65 being designed to effect snug fitting engagement, as indicated in Figs. 6 and 7. When so connected, the part 65 is fixedly held in the socket 74, whereas the member 64 may be rocked or oscillated about the pivot 66. To facilitate this operation, the member 64 is provided with an actuating member or arm 75 which terminates in a finger receiving opening 77.

The front wall 44 is provided with a slot 76, as best illustrated in Figs. 2 and 5, along which the wall 44 is slightly bent or inclined so that the slot will be brought into a substantially horizontal plane, thereby effecting an opening through which the member 75 passes from the back to the front of wall 44. The part which is pressed from the wall 44 to provide slot 76, forms a guide element 86 (see Figs. 3, 5, 6 and 7), above and adjacent the rear edge of slot 76 and assists in preventing wearing action at the slot-edge as a result of oscillation of the member 75.

Figure 1:
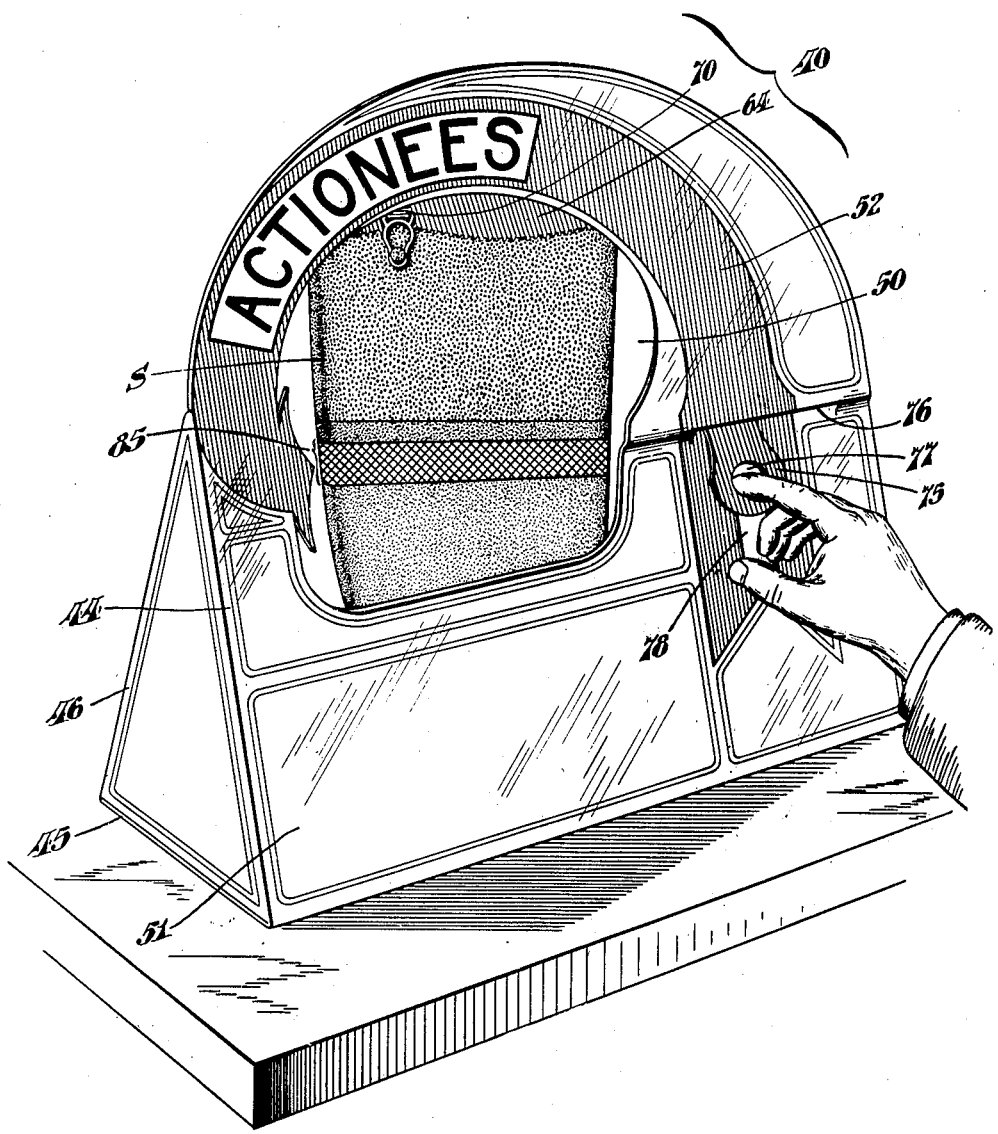
Figure 1 is a perspective view of one form of my novel hosiery display and action demonstrating device.

As illustrated by Fig. 1, the finger of the operator is inserted into the opening 77 and moved up and down to effect actuation of the member 75, a slot 78 being provided in the front wall 44 along the path of movement followed by the finger tip to facilitate this action.

The member 64 of the unit 42 is normally held against a positioning, or stop piece 79, secured to the back of the wall 44, by the action of a tension member, such as a rubber band 80, one looped end of which is engaged in cut 82 and notch 83, of the member 64, and the other looped end in notch 84 of the stop piece 79.

Oscillation of the member 64 about the pivot 66, produces substantially the same effect in the elastic yarn strain absorbing section 85 of the stocking, as when such a stocking is on a human leg and the knee is flexed. By inserting a finger in the opening 77, and depressing the free end of the actuating member 75, from the position shown in Figs. 1, 2 and 6, to that shown in Figs. 4 and 7, the member 64 is turned about its pivot 66, against the tension of rubber band 80, and elastic section 85 of the stocking part S. When the operator's finger is withdrawn from the opening 77, or the downward force on the actuating member 75 is no longer exerted, the elastic yarn section 85 contracts from its stretched condition shown in Figs. 4 and 7 to its normal relaxed condition shown in Figs. 1, 2 and 6, and the member 64 returns to its normal rest position against the stop or positioning element 79. In other words, the member 64 is returned to its normal rest position by the action of the rubber band 80 supplemented by the contracting force of the elastic section 85 of the stocking part S. Operation of the actuating member 75 so as to alternately effect stretching and relaxation of the stocking part S, in the manner described, therefore substantially approximates the action which takes place during flexing of the knee when such a stocking is actually in use on the leg of the wearer.

A modified form of my invention is illustrated in Figures 21 to 31, inclusive. The device there shown is considerably simpler in construction than the device previously described, and comprises an integral frame structure 100, which is formed from a sheet material blank 101, a hosiery actuating element or lever 102, and pivoting means for the latter in the form of cooperating screw elements 135 and 136.

The sheet material blank 101 (Fig. 30), as in the case of the blank 41, may be formed from cardboard or of some other suitable material, and includes a front wall or main panel 103, having an upper extension 104, adapted to function as a hosiery mounting means.

A rigid frame structure comprising a base part or extension 105, which is held in horizontal position with respect to the front wall 103, by means of side, or wing elements 106 and 107, having flap extensions 108 and 109, respectively, which may be secured in suitable manner to base part 105, as by means of tab and slot connections 124 and 126, and 125 and 127, respectively, see Figs. 23, 27 and 30.

To permit displaying the desired portion of the stocking part S, an aperture or window 110 is provided in the front wall 103.

Advertising, or other printed matter, may be applied to the front wall 103, if desired, and this may be enhanced by ornamental panelling 112.

The hosiery mounting means 104, is provided adjacent each side edge with a cleft, or niche 113 and 114, in which the edges of the stocking part S are held by pinching action. Slots 115 are provided for supporting garter or fastener members 116 which are attached to stocking part S to prevent displacement of the upper edge thereof in a walewise direction beyond the extent permitted by the resiliency of the garter members 116.

Assemblage of the sheet material blank 101 is effected by folding the hosiery part mounting element 104 about fold line 117 of the blank 101 so that it will be positioned substantially centrally of the window 110 with the opposite edges thereof parallel to the adjacent edges of the aperture 110. The base 105 is folded along line 118, the side walls 106 and 107 are folded along lines 119 and 120, and the extension elements or flaps 108 and 109 are folded along lines 122 and 123, respectively. The flap elements 108 and 109 are then placed in overlapping relation with the base 105 and fastened thereto, as by glueing, or by engaging tab elements 124 and 125 of the base with the slots 126 and 127 of the flaps 108 and 109, in the manner illustrated.

In order to maintain the hosiery mounting means in the position shown, a rectangular latch or detent element 128 is punched or pressed out of the side wall 107 (Fig. 30). By swinging the punched-out portion downwardly so that it will extend substantially at right angles to the side wall 107, its front longitudinal edge will function to latch or retain the hosiery mounting means 104 fixed relative to the front wall 103, in the manner illustrated in Fig. 24.

The modified device is provided with a different arrangement for actuating the displayed stocking part than the device of Figs. 1–20. The modified device utilizes means whereby the displayed stocking portion to be activated, is mounted on a stationary support which permits sliding thereon of the said portion, when another contiguous portion of the stocking fabric is activated by a movable member. In other words, the displayed and activated stocking portion is mounted on a movable support in the first described device and on a stationary support in modified device. This variation in the mounting arrangement necessitates a corresponding change in the hosiery actuating means. Consequently, the modified device is provided with stocking actuating means including an actuating member 102 (Fig. 31), of sheet material, such as cardboard, having a tab 130 for attachment of a hosiery fastener member 132, (see Fig. 25) and an aperture 133, corresponding to an aperture 134 in the front wall 103 of the frame 100. The apertures 133 and 134 serve as bearings for interengaging screw elements 135 and 136 which pivotally secure the actuating element 102 to the wall 103 in the manner illustrated in Fig. 26. The free end of the actuating element 102 extends through a guide and movement limiting slot 137 formed in the side wall 107.

The stocking part S is secured to the mounting 104 by means of the garter or fastener members 116, and the clamping action of the clefts 113 and 114, in the manner illustrated in Figs. 21 and 23. The lower end of the stocking part S is in direct contact with the front surface of the actuating element 102, and is secured to the latter by the fastener member 132. When the element 102 is in its inactive position the part of the stocking between the lever 102 and the fasteners 116 will be relaxed.

Figure 28:
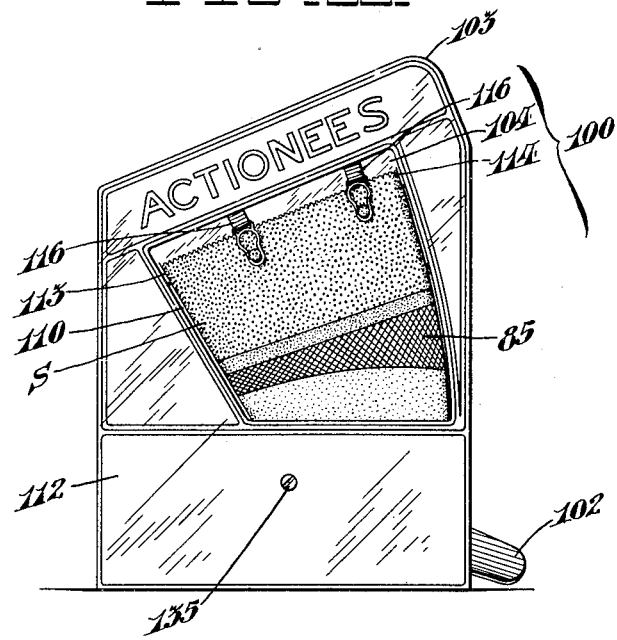
Fig. 28 is a view similar to Fig. 21, but shows certain parts of the device in another position, and the stocking part displayed by the device in stretched condition.
Figure 29:
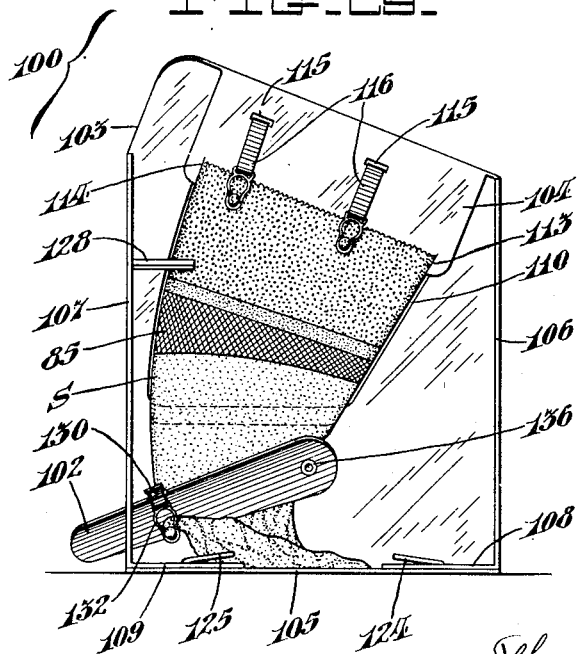
Fig. 29 is a rear view of the device as shown in Fig. 28.

Depressing, or lowering of the free end of lever 102 to the bottom of the slot 137 stretches the elastic yarn section 85 of the stocking part S in the manner illustrated in Figs. 28 and 29. When the downward pressure on the element 102 is released, the elastic yarn section 85 contracts and returns to its normal unstretched or relaxed condition shown in Figs. 21 and 23, and simultaneously raises the element 102 from the position shown in Figs. 28 and 29 to its upper inactive position shown in Figs. 21, 22 and 23. The return movement of the lever 102 from its lowered position is consequently entirely effected by the contracting force of the stocking fabric, as mainly accomplished by the elastic yarn strain absorbing section 85.

Of course, the devices shown and described can be changed and modified in various ways, and may be operated by power means instead of manually, without departing from the invention herein disclosed and hereinafter claimed.

What I claim is:

1. In a hosiery display device, the combination with a frame structure, of flat means mounted on said structure having a hosiery part mounted thereon for exhibition and arranged to permit a portion only of said part to be stretched, and cooperating means arranged to effect stretching of the portion of said hosiery part.

2. In a display device, the combination with a frame structure comprising a plurality of flat plate members connected together of two flat cooperatively arranged elements mounted on said structure adapted to support a hosiery part for exhibition and to stretch the hosiery part exhibited by the device.

3. In a hosiery display device, the combination with a frame structure comprising a plurality of flat members, of flat means of sheet material mounted on said structure and having a hosiery part mounted thereon for exhibition comprising two pivotally connected members adapted to stretch said part by movement of one member relative to the other, and means for attaching one of said members to the frame structure.

4. In a hosiery display device, the combination with a frame structure comprising a plurality of flat plate members connected thereto, of hosiery mounting means resembling in outline a section of the human leg including the knee area and adjacent parts and comprising two cooperatively associated flat members one of which is movable relative to the other, one of said members being mounted on said frame structure and pivotally connected to the other and said members adapted to stretch hosiery mounted on said means by movement relative to each other.

5. In a hosiery display device, the combination with a frame structure formed of cardboard sheet material, of hosiery mounting means resembling in outline a section of the human leg including the knee area and adjacent parts and comprising two cooperatively associated flat members also of cardboard sheet material one of which is movable relative to the other, one of said members being mounted on said frame structure and pivotally connected to the other and said members adapted to stretch hosiery mounted on said means by movement relative to each other, and resilient means for urging said movable member in one direction.

6. In a hosiery display device, the combination with a frame structure comprising a plurality of connected flat plate members, of flat means having a hosiery part mounted thereon for exhibition, and flat means arranged to alternately effect stretching and relaxation of a portion of said exhibited hosiery part.

7. In a hosiery display device, the combination with a frame structure formed of sheet material, of flat means on said structure also of sheet material having a stocking part mounted thereon for exhibition, a reciprocably movable flat element on said structure, and means connecting the element with said stocking part whereby reciprocation of the element stretches the stocking part.

8. In a hosiery display device, the combination with a frame structure formed of cardboard sheet material, flat hosiery mounting means also of cardboard sheet material resembling in outline a section of the human leg including the knee area and adjacent parts and adapted to permit stretching of a hosiery portion thereon, a stocking part on said mounting means having an elastic yarn strain absorbing zone above the knee area, and a flat actuating element cooperatively associated with said stocking part to effect stretching action of said strain absorbing zone in imitation of such action when the stocking is in use on the leg of a wearer.

9. A hosiery display device including in combination, an integral frame structure formed from a blank of sheet material and comprising a front wall having a display aperture, one or more members arranged to maintain the front wall in substantially vertical position, a base, and means for securing said members to said base; flat mounting means also of sheet material and mounted on said wall for a stocking part positioned rearwardly of said aperture; and flat means for actuating a portion of the stocking part visible through said aperture.

10. A hosiery display device including in combination, an integral frame structure formed from a blank of sheet material and comprising a front wall having a display aperture, one or more members arranged to maintain the front wall in substantially vertical position, a base, and means for securing said members to said base; mounting means for a stocking part positioned rearwardly of said aperture; and front wall supported means for stretching a portion of the stocking part visible through said aperture.

11. A hosiery display device including in combination, an integral frame structure formed from a blank of sheet material and comprising a front wall having a display aperture, one or more members arranged to maintain the front wall in substantially vertical position, a base, and means for securing said members to said base; mounting means for a stocking part rigidly connected to said front wall and positioned so that said stocking part is visible through the front wall aperture; and an element for stretching a portion of the visible stocking part movably supported on said mounting means and having an operating extension projecting through said front wall.

12. A hosiery display device including in combination, an integral frame structure formed from a blank of sheet material and comprising a front wall having a display aperture and a guide slot, one or more members arranged to maintain the front wall in substantially vertical position, a base, and means for securing said members to said base; mounting means for a stocking part rigidly connected to said front wall and positioned so that said stocking part is visible through the display aperture; and an element for stretching a portion of the visible stocking part pivotally connected to said mounting means and having an operating extension projecting through said guide slot in the front wall of the frame structure.

13. A hosiery display device including in combination, an integral frame structure formed from a blank of sheet material and comprising a front wall having a display aperture, one or more members arranged to maintain the front wall in substantially vertical position, a base, and means for securing said members to said base; mounting means for a stocking part positioned rearwardly of said aperture; and means for stretching a portion of the stocking part visible through said aperture including a lever pivotally mounted on said front wall.

14. A hosiery display device including in combination, an integral frame structure formed from a blank of sheet material and comprising a front wall having a display aperture, one or more members arranged to maintain the front wall in substantially vertical position, a base, and means for securing said members to said base; mounting means for a stocking part positioned rearwardly of said aperture; a lever pivotally mounted on said front wall; and means for stretching said stocking part by a movement of said lever.

15. A hosiery display device including in combination, an integral frame structure formed from a blank of sheet material and comprising a front wall having a display aperture, one or more members arranged to maintain the front wall in substantially vertical position, a base, means for securing said members to said base, and mounting means for a stocking part positioned rearwardly of said aperture; means for stretching a portion of the stocking part visible through said aperture; and a latch element for maintaining said mounting means in determined position adjacent said front wall aperture.

16. A sheet material blank adapted to form the frame structure of a hosiery display and actuating device, comprising sections shaped to provide the front, sides and base of the device, one of said sections being provided with a guide slot for a hosiery stretching member.

17. A sheet material blank adapted to form the frame structure of a hosiery display and stretching device, comprising sections shaped to provide the front, sides and base of the device, one of said sections being provided with a guide slot for a hosiery stretching member and a slot through which the finger of an operator may be extended when moving said actuating member.

18. A sheet material blank adapted to form the frame structure of a hosiery display and stretching device, comprising sections shaped to provide the front, sides, base, and hosiery mounting means of the device, one of said sections being provided with a guide slot for a hosiery stretching member and a latch element for maintaining the hosiery mounting means in determined position when the device is assembled.

19. In a display device, the combination of a portable self-supporting frame structure formed of sheet material and comprising an upstanding wall having an aperture therein, means connected to said wall for supporting a garment adjacent the back of said wall so that a section is visable through said aperture comprising two pivotally connected members of sheet material, one of said members having said visible section connected thereto and adapted to be moved relative to the other to extend and relax said garment section, and resilient means for restoring said movable member to its original position after it has been moved.

20. A display apparatus for demonstrating the movement of a portion of a textile article, comprising a sheet material front wall having a display window therein, a socket on the rear of said wall, and a two-part pivotally jointed structure adapted to have a textile article supported thereon and having one part adapted to be held in said socket and the other part movable by the operator of the device for stretching a portion of the article in line with said window.

21. A display apparatus as set forth in claim 20 together with means for releasably securing a textile article to the movable portion of the two-part structure, and resilient means for returning the movable part to approximately its original position.

22. A display apparatus comprising a sheet material front wall having a display window therein, a flap extension suspended from the upper edge of said wall and arranged to fold against the rear face of said wall across said window, a stocking portion on said extension, means for holding said portion on said extension, a lever pivoted on said wall, and means for connecting said lever with said stocking portion in a position in which turning said lever extends said portion.

23. In a display device, the combination of a portable self-supporting frame structure formed of sheet material and comprising an upstanding wall having an aperture therein, means for supporting a garment adjacent said wall so that a section is visible through said aperture comprising two pivotally jointed members of sheet material, one of said members fixed relative to said wall and the other movable by an operator, and means for extending and relaxing said garment section upon reciprocating movement of said member.

24. A display apparatus for demonstrating the movement of a portion of a textile article, comprising a sheet material wall having a display window therein, a socket on the rear of said wall, a two part pivotally jointed structure adapted to have a textile article supported thereon and having one part adapted to be immovably mounted in said socket and the other part movable by the operator of the device, whereby movement of one part thereof relatively to the other imparts substantially maximum stretch to one side only of an article embracing both parts thereof.

25. A display apparatus as set forth in claim 24 together with resilient means for returning the movable part of the jointed structure to a predetermined position.

26. In a display device, the combination of a portable self-supporting frame structure formed of sheet material and comprising an upstanding wall having an aperture therein, combined means for supporting a garment adjacent said wall so that a section is visible through said aperture and for stretching one side of a garment so supported without substantially stretching the opposite side comprising means to fix one section of said garment with relation to said wall and a member supported from said wall and mounted for pivotal motion with respect thereto and connected to a section of said garment sufficiently removed from the pivot of the member so that a movement of the member on its pivot stretches said garment intermediate said connected sections.

ALFRED E. ISCHINGER.